Figure 1:
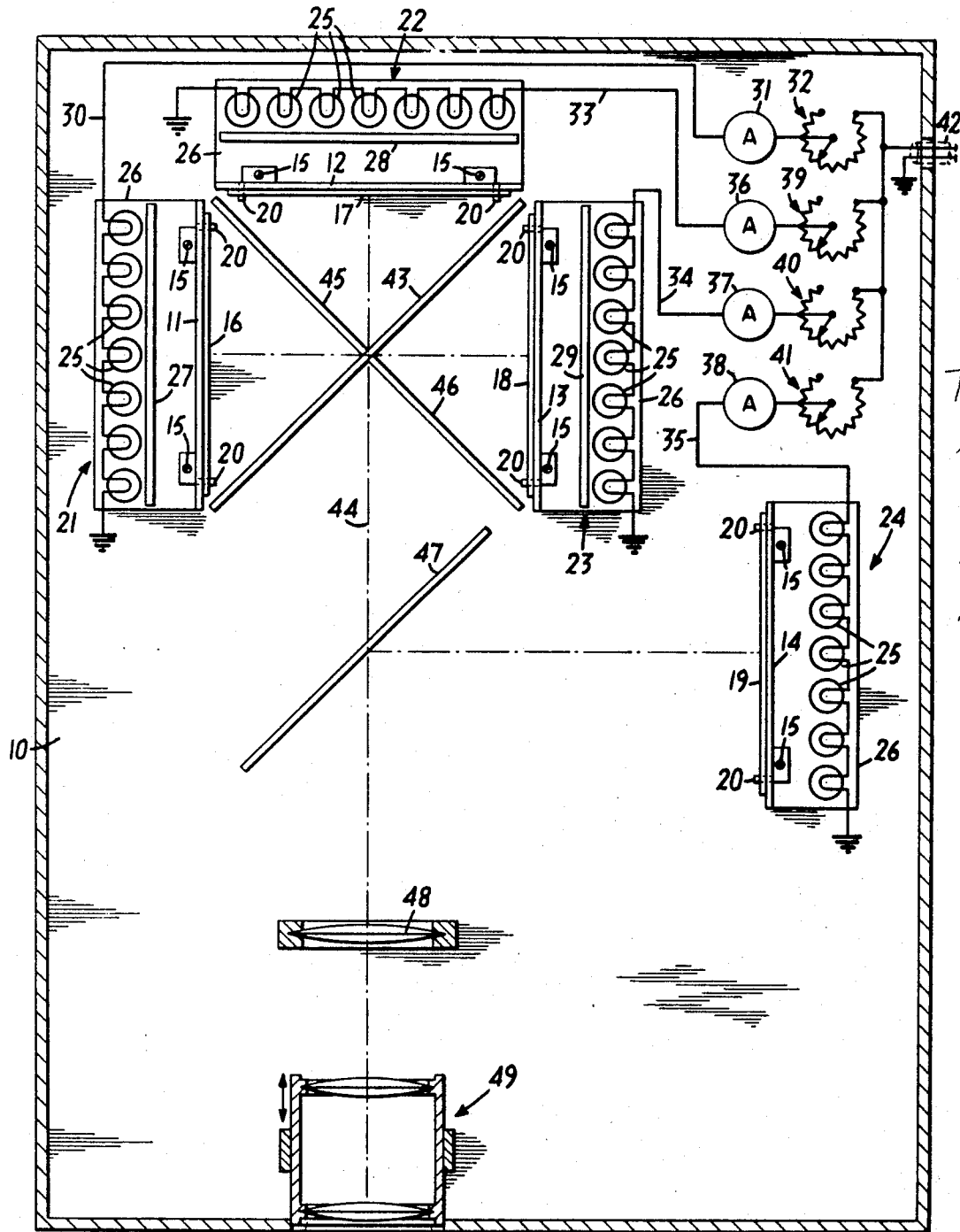

May 9, 1967 H. KOTT 3,318,185
INSTRUMENT FOR VIEWING SEPARATION COLOR TRANSPARENCIES
Filed Nov. 27, 1964 2 Sheets-Sheet 2

INVENTOR.
HERMANN KOTT
BY
Brumbaugh, Free, Graves & Donohue
his ATTORNEYS

United States Patent Office 3,318,185
Patented May 9, 1967

3,318,185
INSTRUMENT FOR VIEWING SEPARATION
COLOR TRANSPARENCIES
Hermann Kott, Essex Fells, N.J., assignor to Publication Corporation, New York, N.Y., a corporation of New York
Filed Nov. 27, 1964, Ser. No. 414,130
3 Claims. (Cl. 88—24)

This invention relates to devices for viewing separation color transparencies and, more particularly, to a new and improved viewer for producing a synthesized color image from separation color transparencies in which the color balance of the synthesized image can be controlled.

Before preparing a color print from separation color transparencies, it is usually desirable to obtain some indication of the color balance which will be provided by the transparencies in the finished picture, thereby enabling the selection of exposures so as to obtain the proper color balance. Moreover, where retouching of the transparencies will be necessary, it is preferable to provide the retoucher with a representation of the final print to indicate the areas in which retouching is desirable. Also, if the separation color transparencies are not suitable and must be prepared again, it is desirable to ascertain that fact at the earliest possible time. Heretofore, a color print or proof has usually been made from the separation color transparencies without any preliminary viewing of the color image and estimates as to the necessary changes to provide the proper color balance have then been made and the process repeated again to obtain the final prints.

Accordingly, it is an object of the present invention to provide a separation color transparency viewer which overcomes the above mentioned disadvantages of the prior art.

Another object of the invention is to provide a viewer of the above character whereby a color image corresponding to that of a final print may be synthesized from the separation color transparencies.

A further object of the invention is to provide a viewer for synthesizing a color image from separation color transparencies wherein the color balance of the image may be altered as desired.

These and other objects of the invention are attained by providing a plurality of separation color transparency supports, a plurality of different color illuminators for illuminating the transparencies mounted on the transparency supports with different colors of light, and a plurality of dichroic mirrors arranged to reflect correspondingly colored light from the transparency support positions into a composite image beam. If desired, a black printer transparency support may be included, along with a corresponding white light illuminator and a neutral semi-transparent mirror, to incorporate the black printer image into the composite image beam. Preferably, the viewer also includes a lens system for projecting the composite image toward a remote viewing screen and separate intensity control and indicating arrangements for each illuminator so as to control the color balance of the composite color image.

Figure 2:
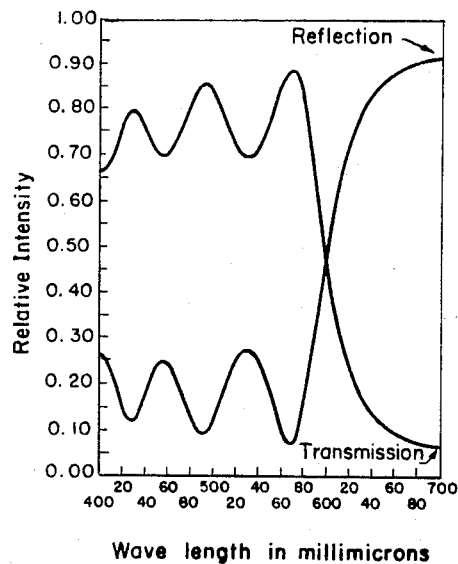
Figure 3:
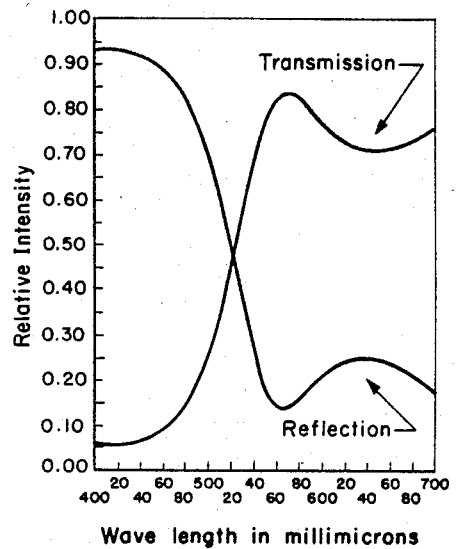
Figure 4:
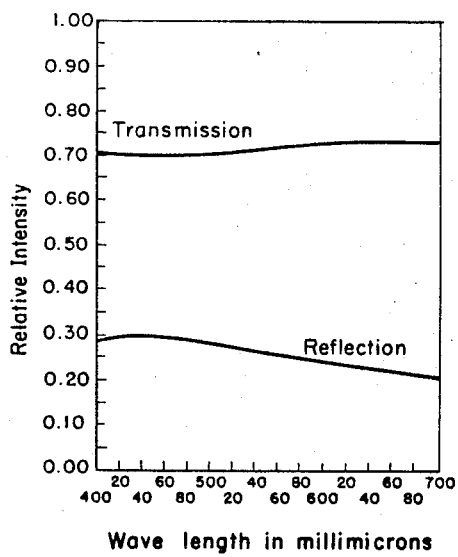

Further objects and advantages of the invention will be apparent from the reading of the following description in conjunction with the accompanying drawings, in which:

FIG. 1 is a plan view, partly schematic, illustrating a representative instrument for viewing separation color transparencies according to the invention; and FIGS. 2, 3 and 4 are graphical representations of the transmission and reflection characteristics of certain reflective components of the instrument.

In the typical viewer shown in FIG. 1, a horizontal base plate 10 carries four vertical transparency supports 11, 12, 13, and 14 which are rigidly attached to the base plate by mounting bolts 15. Preferably, each of the supports 11, 12, 13, and 14 consists of a sheet of glass surrounded by a metal frame and, to hold a group of separation color transparencies 16, 17, 18, and 19 in precisely corresponding positions on the supports 11, 12, 13, and 14, respectively, two locating pins 20 are affixed in corresponding locations on the supports, the transparencies being punched with corresponding holes so as to assure accurate registration of the images therefrom.

In order to illuminate the tranparencies with light of different colors, four illuminators 21, 22, 23, and 24 are mounted on the base plate 10 behind the supports 11, 12, 13, and 14, respectively. Each illuminator includes a plurality of light bulbs 25 disposed so as to provide uniform distribution of light on the transparency and, in order to block extraneous illumination, the housing 26 of each illuminator projects forwardly to form an enclosure about the transparency support. The three illuminators 21, 22, and 23 behind the supports 16, 17, and 18, respectively, also include color filters 27, 28, and 29 between the light bulbs and the transparency support to illuminate the transparency with different colored light whereas the illuminator 24 has no color filter and provides white light illumination for the transparency 19.

Within the illuminator 21, the filter 27 has a blue light transmission characteristics corresponding to the blue dye characteristic which will appear in the final print. Similarly, the filters 28 and 29 have green and red light transmission characteristics, respectively, corresponding to the green and red dye characteristics of the final print. Moreover, the light blubs 25 in the blue illuminator 21 are energized from a line 30 leading through an ammeter 31, which provides an indication of the illumination intensity, to a control rheostat 32 by which the blue light intensity may be varied. In a similar manner, the green light illuminator 22, the red light illuminator 23, and the white illuminator 24, are also energized through corresponding lines 33, 34, and 35 connected through corresponding indicators 36, 37, and 38 to control rheostats 39, 40, and 41, respectively, to supply power to the rheostats. One side of an input power line 42 is connected to all of the rheostats while the other side of the power line is grounded.

In accordance with the invention, the separation color transparencies, made through the complementary color filters, are mounted on the corresponding supports so that transparencies 16, 17, and 18 are those made through blue, green, and red filters, respectively. Also, the black printer transparency 19 is mounted on the support 24 to be illuminated with white light. In order to combine the images from these separation color transparencies so as to provide a synthesized color image representing the final print, a red light-reflecting dichroic filter element 43 is mounted vertically on the base 10 in a diagonal position so as to reflect light from the center of the transparency 18 perpendicularly along an axis 44 which coincides with the axis perpendicular to the center of the green-illuminated transparency 17. A typical red-reflecting dichroic filter suitable for this purpose is the Libbey-Owens-Ford Glass Company specification No. 2040 having the transmission and reflection characteristics illustrated in FIG. 2.

Furthermore, two halves 45 and 46 of a blue light-reflecting dichroic mirror are mounted on opposite sides of the mirror 43 in a diagonal line perpendicular to the mirror 43 so as to reflect light from the center of the blue-illuminated transparency 16 perpendicularly along the axis 44. A typical blue-reflecting dichroic mirror suitable for this purpose is the Libbey-Owens-Ford Glass Company specification No. 2031 having the transmission and reflection characteristics illustrated in FIG. 3.

In addition, a neutral semi-transparent mirror 47 is mounted diagonally across the axis 44 in line with the transparency 19 so as to reflect white light perpendicularly from that transparency along the axis 44 while transmitting the combined beam from the various color images without alteration of the color balance thereof. In a preferred embodiment, the semi-reflecting mirror 47 is arranged to transmit approximately 70% of the incident light and reflect 30% thereof, and a typical semi-reflecting mirror suitable for this purpose is the Libbey-Owens-Ford Glass Company specification No. 2015 having the transmission and reflection characteristics illustrated in FIG. 4.

Preferably, the mirrors 43, 45, 46, and 47 are cemented in corresponding grooves (not shown) cut into the base plate 10 and, to assure complete rigidity, they may also be cemented at the top into corresponding grooves in an upper support plate (not shown) and the edges of the two halves 45 and 46 which abut the mirror 43 may be similarly cemented.

To provide the same image size from all of the transparencies, it will be readily apparent that the optical distances from each transparency to the center of the mirror 47 must be the same. Accordingly, the transparencies 16, 17, and 18 are disposed along three sides of a square and are equidistant from the center of the dichroic mirrors 43, and 45, 36, which are disposed along the diagonals of the square, while the transparency 19 is spaced from the mirror 47 by the same distance as the transparency 17. Also, to avoid distortion, the transparencies should be supported perpendicularly to the axis 44 or to the reflection thereof.

Finally, a projection lens system is provided comprising a lens element 48 mounted in fixed position on the base plate 10 and a focusing lens unit 49 mounted for adjustable positioning along the axis 44, both of these lenses being co-axial with the image beam projected along the axis 44. With this arrangement a synthesized color image combining the characteristics of the transparencies 16, 17, 18, and 19 may be projected. If desired, the lenses 48 and 49 may be omitted and visual observation of the synthesized color image may be accomplished by looking along the axis 44 in the direction toward the mirrors.

In operation, the separation color transparencies 16, 17, and 18 which were exposed through the blue, green, and red filters, respectively, are mounted on the corresponding support members 11, 12, and 13, and the black printer transparency 19 is mounted on the support 14. For convenience in mounting the transparencies, the supports 11, 12, 13, and 14 may include slidably removable transparency receiving sections (not shown) and, if desired, the transparencies may be mounted thereon directly from the processing stage without waiting for them to dry. Power supplied through the cable 42 illuminates the bulbs 25 in all of the illuminators and the filters 27, 28, and 29 provide blue, green, and red illumination for the yellow, magenta, and cyan transparencies. Inasmuch as both of the dichroic mirrors 43 and 45, 46 transmit green light, the green image from the transparency 17 is transmitted along the axis 44 without appreciable color change. Similarly, the blue image from the transparency 16 and the red image from the transparency 18, reflected by the mirrors 43 and 45, 46 without substantial change in color, are combined with the green image along the axis 44. Finally, the black printer image projected in white light is reflected by the mirror 47 along the axis 44 and the combined color image is projected by the lenses 48 and 49 to a remote screen for viewing.

Inasmuch as the current readings of the meters 31, 36, 37, and 38 provide an indication of the relative light intensities in the combined image, those readings may be used to determine the exposure values required through each transparency to provide the proper color balance in the final print. If the color balance of the combined projected image is not correct, it may be adjusted by altering the relative light intensities by means of the rheostat 32, 39, 40, and 41. With this arrangement, therefore, the relative exposures necessary to provide the proper balance of the final print may be determined without making a preliminary print. Moreover, if it would not be possible to obtain the proper color balance with the separation transparencies which are mounted on the supports, that fact can be determined by observation of the synthesized color image and, where retouching is required, the extent and location of the necessary retouching can be ascertained from the combined image provided by the viewer.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A viewer for separation color transparencies comprising a base member, a plurality of transparency supports mounted on the base member, a plurality of illuminators, each associated with one of the transparency supports, to illuminate transparencies mounted on the transparency supports with different colors of light respectively, and semitransparent mirror means for reflecting colored light from at least one of the transparency supports and transmitting light of a different color from another transparency support along a common axis to provide a synthesized color image, including a black printer transparency support mounted on the base member, a white light illuminator to illuminate a transparency mounted on the black printer transparency support and neutral partially reflective mirror means for reflecting light from the black printer transparency support along the common axis in conjunction with the synthesized color image.

2. A viewer for separation color transparencies comprising a base member, a plurality of transparency supports mounted on the base member, a plurality of illuminators, each associated with one of the transparency supports, to illuminate transparencies mounted on the transparency supports with different colors of light respectively, and semitransparent mirror means for reflecting color light from at least one of the transparency supports and transmitting light of a different color from another transparency support along a common axis to provide a synthesized color image, wherein the plurality of transparency supports comprises three supports disposed along three sides of a square and having central axes intersecting, and the semitransparent mirror means comprises two semitransparent mirrors disposed diagonally with respect to the central axes and intersecting at the intersection of the axes.

3. A viewer for separation color transparencies comprising a base member, three transparency supports mounted on the base member and centrally disposed along three sides of a square, an illuminator for each transparency support to illuminate transparencies mounted thereon with red, green, and blue light, respectively, the green illuminated transparency support being disposed at the side of the square between the red and blue illuminated transparency supports, a first dichroic mirror for reflecting red light and transmitting green and blue light disposed along one diagonal of the square so as to reflect light from the red illuminated transparency perpendicularly along the axis of the green illuminated transparency, and a second dichroic mirror for reflecting blue light and transmitting red and green light disposed along the other diagonal of the square so as to reflect light from the blue-illuminated transparency perpendicularly along the axis of the green-illuminated transparency.

References Cited by the Examiner

UNITED STATES PATENTS

| 2,346,983 | 4/1944 | Mayer et al. | 88—24 |
| 2,402,660 | 6/1945 | O'Grady | 88—24 |
| 2,642,487 | 6/1953 | Schroeder | 88—1 |

NORTON ANSHER, *Primary Examiner.*

F. L. BRAUN, *Assistant Examiner.*